United States Patent [19]

Mueller

[11] Patent Number: 5,914,371
[45] Date of Patent: Jun. 22, 1999

[54] SELF FUSING TAPE

[75] Inventor: Bernard K. Mueller, Booneville, Ark.

[73] Assignee: Sealwrap Systems, LLC, Indianapolis, Ind.

[21] Appl. No.: 09/023,582

[22] Filed: Feb. 13, 1998

[51] Int. Cl.[6] .............................. C08F 8/00; C08L 27/04; C08L 33/14
[52] U.S. Cl. .......................... 525/191; 525/213; 525/214; 525/215; 525/232
[58] Field of Search ..................................... 525/191, 213, 525/214, 215, 232

[56] References Cited

U.S. PATENT DOCUMENTS 4,207,429 6/1980 Ward .
4,536,445 8/1985 Toy .
4,788,245 11/1988 Anderson .
4,925,715 5/1990 Sato .
5,268,151 12/1993 Kent et al. .

*Primary Examiner*—Nathan M. Nutter
*Attorney, Agent, or Firm*—Woodard, Emhardt, Naughton, Moriarty & McNett

[57] ABSTRACT

The present invention provides self-fusing, or self-amalgamating, compositions comprising rubber blends, preferably formed into a tapes, which, after being elongated and, for example, wrapped around a substrate, fuse together to form a continuous layer. In preferred aspects of the invention, the composition comprises a partially pre-crosslinked polyisoprene, a halogenated polyisobutylene, a medium molecular weight polyisobutylene, a non-extractable plasticizer and a mineral filler.

25 Claims, No Drawings

SELF FUSING TAPE

BACKGROUND OF THE INVENTION

1. Field of the Invention

The present invention relates generally to self-fusing, or self-amalgamating, compositions. More particularly, the invention relates to rubber blend compositions, preferably formed into tapes, which, after being elongated and, for example, wrapped around a substrate, fuse together to form a continuous layer. In preferred aspects of the invention, the layer advantageously functions as an electrical insulator and/or waterproof cover.

2. Discussion of Related Art

Dimensionally recoverable, or shrinkable, articles such as tubular and wraparound sleeves are known for use in enclosing or covering elongate substrates such as pipes or cables and, in particular, cable joints or splices. Such sleeves are useful for providing environmental and corrosion protection, and for providing additional structural integrity, to joints, fittings and welds by which pipes, cables, conduits and other elongated members are joined. One well-known type of material for forming such protective sleeves is a dimensionally heat recoverable, or heat shrinkable, material, which, when applied over a joint and subjected to heat, shrinks tightly into contact with the substrate.

Dimensionally recoverable articles which do not require heat to effect recovery are also known. As one example, there are known articles which are formed of an elastomeric sheet or tube held in an expanded state by a restraining means which can be removed or separated from the elastomeric member to permit it to recover to the unexpanded state. Contact adhesives, or other adhesives may be used to seal such a recovered article to a substrate.

Another type of shrinkable tubing material which does riot require heating is a shrinkable protective tubing which has been dilated with chemicals to bring the same to a dilated or expanded state. This type of tubing remains dilated or expanded so long as it is kept out of contact with air; however, once the tubing contacts ambient air, it shrinks back to its initial size without the application of heat.

As an alternative to pre-formed, shrinkable sleeves as described above, there are known in the prior art thin sheets or tapes which may be layered over an article in a wrapping action to provide protection from the environment or to provide structural integrity to, for example, a joint or splice. In pipe wrapping operations, for example, a separate adhesive layer is generally used to achieve adhesion to the substrate and of the overlapping layers to each other. In electrical applications such as cable splicing, the tape is wrapped, usually spirally, around an electric cable.

Attempts have also been made to produce self-bonding tapes from compounds containing chlorosulfonated and chlorinated polyethylene and various compounding ingredients such as fillers, plasticizers and tackifiers. An advantage of such a product is that it avoids the use of adhesives, which are difficult and expensive to handle and apply to a tape. These self-bonding tapes, however, were found to be tacky in the relaxed state, rendering them difficult to handle.

Various self-bonding tapes have been previously described, for example, in U.S. Pat. No. 4,788,245 to Anderson; U.S. Pat. No. 4,925,715 to Sato; and U.S. Pat. No. 5,268,051 to Kent et al. In the '245 patent, there is disclosed a composition comprising specific ratios of the following components: a rubber component selected from the group consisting of conjugated diene butyl rubber and halobutyl rubber; a polyisobutylene tackifier; a polyethylene; carbon black; and an antioxidant.

The Sato patent discloses a tension-wound, linerless roll of tape comprising in specifically described ratios (I) a polymer mixture selected from the group consisting of (a) a mixture of a polymer of ethylene having a density of from about 0.945 to about 0.965 grams/cm$^3$ with an elastomeric polymer, (b) a mixture of a linear low density polymer of ethylene having a density of from about 0.91 to about 0.94 grams/cm$^3$ with an elastomeric polymer, and (c) a mixture of isotactic polypropylene with an elastomeric polymer, said elastomeric polymer consisting of an isobutylene isoprene polymer and one or more polymers selected from (i) natural rubber, (ii) a homopolymer of isobutylene having a molecular weight from about 50,000 to about 100,000, and (iii) a polymer of ethylene and propylene containing from about 50 to about 65 percent by weight ethylene; and (II) from 0.4 to 4 parts (per 100 parts of said polymer mixture) of fatty amide anti-blocking agent.

In the Kent et al patent there is disclosed a tape comprising in specifically described ratios a raw polymer mixture of (a) a chlorosulfonated polyethylene rubber; (b) a thermoplastic polymer selected from the group consisting of (i) a polymer of ethylene having a density of from about 0.945 to about 0.965 gm/cm$^3$ (ii) a linear low density polymer of ethylene having a density of from about 0.91 to about 0.94 gm/cm$^3$, and (iii) isotactic polypropylene; (c) a chlorinated polyethylene rubber; (d) an elastomeric polymer selected from the group consisting of (i) isobutylene-isoprene polymer, (ii) homopolymer of isobutylene having a Staudinger molecular weight from about 30,000 to about 100,000 and (iii) a polymer of ethylene and propylene containing from about 50 to about 65 percent by weight of ethylene for a total of 100 parts of (a), (b), (c) and (d); and (e) from about 0.5 to about 20 parts per 100 parts of (a), (b), (c) and (d) of one or more filler or pigment.

The compositions disclosed in these patents have the same disadvantage, however, that they all comprise in significant proportions plastic materials such as polypropylene, polyethylene, linear low density ethylene polymer and/or isotactic polypropylene. While the plastic compositions therein improve the processability of the overall composition, the plastic components and the rubber components are not highly cohesive and, therefore, after the ingredients are blended, the blend must be crosslinked to produce a final composition having adequate physical properties. For example, the Anderson patent teaches that a blend made in accordance therewith must be vulcanized by radiation. Radiation generation, however, is very expensive, thus necessitating a large capital investment to make self-amalgamating materials in accordance with the Anderson patent. An additional disadvantage of blends comprising plastic materials, is that the required crosslinking creates a significant likelihood of oxidation. The crosslinks in such a composition are points for oxygen to attack, thereby resulting in oxidation of the polymers. Additionally, the presence of plastics in these materials makes necessary a significant amount of tackifier. The amount of tackifier needed increases as a function of the proportion of plastic components in the material.

These and other problems associated with self-fusing, or self-amalgamating compositions disclosed in the prior art are overcome by the present invention, which teaches a rubber blend, in which the blend of starting materials need not be crosslinked prior to use. Thus, inventive compositions are significantly more resistant to degradation than self-fusing compositions taught in the prior art, are significantly less costly to produce and exhibit a significantly longer useful life. Further, inventive compositions exhibit excellent physical properties, such as elongation, tensile strength, resistance to ozone, sunlight, UV, moisture and salt spray, volume resistivity and dielectric properties. Inventive compositions are useful across a wide range of temperatures, retaining their advantageous properties at temperatures as low as, for example, −40° F., and as high as, for example, 250° F. Thus, the invention provides compositions and methods which satisfy a long-felt need in the prior art for a self-fusing material which may be economically made and which exhibits excellent physical properties.

SUMMARY OF THE INVENTION

The present invention overcomes the shortcomings of prior art attempts to provide self-fusing tapes. The invention provides compositions, and tapes made therefrom, which are readily made by blending elastomeric materials and additives, and which exhibit excellent physical properties. Inventive compositions do not require the inclusion of plastic materials, and therefore need not be cured during or after blending or processing.

In one aspect of the invention, there is provided a self-fusing composition which comprises a base composition comprising from about 40 to about 80 parts by weight of a partially pre-crosslinked polyisoprene per 100 parts base composition and from about 20 to about 60 parts by weight of a halogenated polyisobutylene per 100 parts base composition. The self-fusing composition also comprises from about 20 to about 40 parts by weight, per 100 parts base composition, of a second polyisobutylene having a molecular weight of from about 200,000 to about 450,000; from about 2 to about 18 parts by weight, per 100 parts base composition, of a non-extractable plasticizer; and from about 40 to about 80 parts by weight, per 100 parts base composition, of a mineral filler.

In another aspect of the invention, there is provided a method for making a self-fusing composition. In this aspect of the invention, a composition is provided which comprises a partially pre-crosslinked polyisoprene, and the polyisoprene is blended with a halogenated polyisobutylene to provide a master batch. Into the master batch is blended a medium molecular weight polyisobutylene, a non-extractable plasticizer and a mineral filler to provide a finished batch, and the finished batch is aged at ambient temperature for at least about 24 hours, at which time the finished batch may advantageously be calendered to provide a self-fusing tape having a thickness of from about 0.001 to about 0.120 inches.

In another aspect of the invention, there is provided a method for making a self-fusing composition, comprising: (1) blending a peptizer and a partially pre-crosslinked natural rubber to provide a composition having from about 0.2 to about 1.4 parts peptizer by weight per 60 parts natural rubber; (2) rolling the composition into a first sheet; (3) maintaining the first sheet at ambient temperature for at least about 24 hours; (4) blending a halogenated polyisobutylene with the peptized isoprene to provide a master batch; (5) rolling the master batch into a second sheet; (6) blending into the master batch a medium molecular weight polyisobutylene, a non-extractable plasticizer and a mineral filler to provide a finished batch; (7) rolling the finished batch into a third sheet; (8) maintaining the third sheet at a ambient temperature for at least about 24 hours; and (9) calendering the third sheet to provide a self-fusing tape having a thickness of from about 0.001 to about 0.120 inches.

In another aspect of the invention, there is provided a method for making a self-fusing composition, comprising: (1) providing a master batch blend comprising a partially pre-crosslinked polyisoprene and a halogenated polyisobutylene; (2) blending into the master batch a medium molecular weight polyisobutylene, a non-extractable plasticizer and a mineral filler to provide a finished batch; and (3) aging the finished batch at ambient temperature for at least about 24 hours.

In another aspect of the invention, there is provided a method for making a self-fusing tape. To make such a tape, a composition comprising a partially pre-crosslinked polyisoprene, a halogenated polyisobutylene, a medium molecular weight polyisobutylene, a non-extractable plasticizer and a mineral filler is provided, wherein the composition has been aged at ambient temperature for at least about 24 hours; and the composition is calendered to provide a self-fusing tape having a thickness of from about 0.001 to about 0.120 inches.

It is an object of the invention to provide self-fusing compositions useful for providing environmental and corrosion protection to, and for providing additional structural integrity to, for example, joints, fittings and welds by which pipes, cables, conduits and other elongated members are joined.

It is also an object of the invention to provide self-fusing compositions which are essentially free from plastic materials and the disadvantages attendant thereto.

It is a further object of the invention to provide self-fusing compositions which may be made more inexpensively than self-fusing compositions disclosed in the prior art.

Further objects, advantages and features of the present invention will be apparent from the detailed description herein.

DETAILED DESCRIPTION OF PREFERRED EMBODIMENTS

For purposes of promoting an understanding of the principles of the invention, reference will now be made to particular embodiments of the invention and specific language will be used to describe the same. It will nevertheless be understood that no limitation of the scope of the invention is thereby intended, such alterations and further modifications in the invention, and such further applications of the principles of the invention as described herein being contemplated as would normally occur to one skilled in the art to which the invention pertains.

The present invention relates in one respect to rubber blend compositions useful for covering an elongate substrate such as, for example, a wire, cable or conduit. In other aspects of the invention, there are provided methods for making and using inventive compositions and for forming the compositions into useful products. Inventive compositions are preferably formed into a sheet, or tape, having a thickness of from about 0.001 to about 0.120 inches and a width of from about 1 to about 8 inches. An inventive tape is preferably formed into a roll prior to use such that it is adjacent to and removably affixed to a film, such as for example, Holland cloth or a polyethylene backing. This film prevents the tape from becoming prematurely misshapen or fused.

An inventive tape product may be applied to a substrate by subjecting the tape to a stretching elongation of from about 50 percent to about 850 percent and, in the elongated state, applying it to the substrate in a spiral-wrapping action. Such stretching results in the tape developing the ability to self-bond and the overlapping layers fuse strongly together. Within a few minutes of application, these layers have the appearance of a fused sheet on or covering the substrate. In a preferred manner of using an inventive tape, the tape is elongated while spirally wrapping the tape at an angle whereby the elongated tape continuously comes into contact with and overlies a portion of the tape previously wrapped. Additional layers may preferably be wrapped at each end of the previously-laid tape to add stability to the cover. Applied as such, the overlying tape portions fuse together to form a water-tight, substantially non-conductive rubber sleeve over the substrate. The upper limit of elongation depends on the composition of the particular sheet or tape and must be below the level which would cause the sheet or tape to rupture. It has been found that an elongation of from about 100 percent to about 800% provides an optimum balance between developing satisfactory self-bonding properties and avoiding rupture in preferred aspects of the invention.

The tapes of the present invention may be used in a wide variety of applications such as splicing, encapsulation and connection. Metal parts can be readily covered with an inventive tape for storage or environmental reasons; for example, a metal pylon may be so covered to protect it when immersed in water. Alternatively, minor repairs may be made to existing covers of exposed parts, for example, underneath cars, trucks, or other like vehicles. Damaged boots on tie rod ends or rack and pinion steering components may be readily repaired with a tape in accordance with this invention. The process may also be used in the electrical trade for splicing cables, and for repairing splices and damaged insulation. The process may also be used, for example, in the heating and cooling industry to seal or strengthen conduit connections that contain fluids.

In accordance with the invention, a self-fusing composition is preferably made in a batch process by first peptizing a partially pre-crosslinked polyisoprene to provide a peptized rubber; next blending the peptized rubber with a halogenated polyisobutylene to provide a master batch; and, finally, blending into the master batch a medium molecular weight polyisobutylene, a non-extractable plasticizer and a mineral filler to provide a finished batch. The finished batch is then preferably processed into a sheet, which is aged for a period of time sufficient to allow filler materials to wet out, preferably for at least about 24 hours. As used herein, the term "wet out" is intended to refer to a phenomenon wherein liquid components in the finished batch are absorbed into the solid components and is a well-known term in the relevant field. In certain preferred aspects of the invention, the mixture of partially pre-crosslinked polyisoprene and peptizer is also aged, preferably at least about 24 hours, to complete the peptizing reaction. After the finished batch is aged, the sheet may be calendered to a preferred thickness, affixed to a film backing and formed into individual rolls.

The partially pre-crosslinked polyisoprene may be, in alternate aspects of the invention, a natural rubber or a synthetic polyisoprene. While the following detailed description primarily discusses natural rubber, the term "partially pre-crosslinked polyisoprene" is intended to encompass natural and synthetic polyisoprenes having the advantageous characteristics in accordance with the invention. In one preferred aspect of the invention, the polyisoprene is a partially pre-crosslinked standard Indonesian rubber ("SIR") or a partially pre-crosslinked standard Malaysian rubber ("SMR"). The term "partially pre-crosslinked," as used herein, is intended to refer to a degree of crosslinking which gives the rubber a viscosity within certain industry defined specifications. For example, after the coagulation of a natural rubber with ammonia, it is common for a specific proportion of sulfur to be added to the polymer to achieve a preselected amount of crosslinking of the polymer, thereby producing rubber products having controlled viscosity. In certain preferred aspects of the invention, the amount of sulfur in a polyisoprene starting material is on the order of about 0.1 part sulfur per about 100 parts polymer. Examples of advantageous rubbers are the products SIRCV60 and SMRCV60, which are readily available commercially, for example from Alcan Rubber & Chemical, Inc. (New York, N.Y.) and The Goodyear Tire & Rubber Company, Inc. (Akron, Ohio). For purposes of describing the invention, processing of the polyisoprene SIRCV60 will be described in detail; however, it is intended that the invention encompass a wide variety of polyisoprenes, natural and synthetic, as may be selected by a person skilled in the art to which the invention pertains.

SIRCV60 is peptized in accordance with the invention in order to alter its Mooney viscosity. It is understood that, when a natural rubber is tapped from a tree, it includes, in addition to polyisoprene polymers, a significant proportion of polypeptides (proteins). Thus, when a natural rubber such as, for example, SIRCV60 is used in accordance with the invention, it is preferably first mixed with a peptizer which breaks down the proteins in the composition to thereby decrease the viscosity of the natural rubber. It is preferred in accordance with the invention that the finished batch have a Mooney viscosity of from about 17 to about 27, and it is within the purview of a person skilled in the art to determine whether a particular natural rubber should be peptized before being blended with other starting materials to make an inventive product. It is also readily understood that in embodiments wherein synthetic polyisoprene is used, it will typically also need to be peptized.

Peptizing is preferably achieved in accordance with the invention by mixing the SIRCV60 and the peptizer, such as, for example, PEPTON 44, in a Banbury mixer for a period of time sufficient to thoroughly mix the SIRCV60 and the peptizer and to heat the mixture to a temperature of from about 300° F, to about 350° F. It is understood that the action of the Banbury will result in the generation of heat and that, therefore, the materials in the Banbury mixer may be brought to the preselected temperature simply by monitoring the temperature of the materials in the mixer. It is expected that mixing should continue on average for a period of from about 3 minutes to about 7 minutes, more commonly from about 3½ to about 6½ minutes. It is typically not necessary, therefore, to provide additional heat to the mixture from outside sources. It is believed that the best results are obtained when the mixture is held at a temperature of about 325° F. for about three minutes. PEPTON 44 and a wide variety of alternate peptizers are readily available commercially.

It is understood that the mixing may also be achieved in an alternate type of mixer such as, for example a roll mill. However, conventional roll mills have significantly less capacity to mix large batches and it is an advantageous aspect of the invention that inventive products may be efficiently made in a large-quantity batch process using as the primary mixer a Banbury mixer. A typical roll mill applies significantly more shear to a load and, therefore, is often considered to achieve better mixing than a Banbury mixer; however, a typical roll mill has a maximum load capacity of about 160 pounds, whereas a batch of up to about 2000 pounds can be mixed in a Banbury mixer. Therefore, inventive compositions may be made more cost-effectively using a Banbury mixer. It is understood that a roller mill may advantageously be used to sheet a batch dropped from a Banbury mixer, and this sheeting provides a supplemental mixing of the ingredients. Initial mixing, however, is preferably achieved in a Banbury mixer.

Once the SIRCV60 and the PEPTON 44 is thoroughly mixed in the Banbury, the load is preferably dropped onto a water-cooled roll mill, where the load is cooled and formed into sheets. It is understood that the Banbury mixer may conveniently be placed in a position above the mill, such as, for example, on the second floor of a processing plant. With the mill positioned beneath the mixer, a load may be dropped directly into the mill for sheeting, thereby significantly reducing the amount of material handling required, and reducing the cost of making inventive products. It is preferred that the rolls of the roll mill be water-cooled, so that the formation of sheets; in the mill begins the cooling process of the load. Once the mixture is formed into sheets, the sheets are preferably placed onto pallets for further cooling and aging. In a preferred aspect of the invention, the sheets are allowed to cool to ambient temperature (i.e., to a temperature of from about 20° C. to about 26° C.) and to age for at least about 24 hours to complete the peptizing reaction.

A peptized rubber, or a synthetic polyisoprene in certain aspects of the invention, is then blended with a halogenated polyisobutylene, preferably in a Banbury mixer, to provide a master batch. The halogenated polyisobutylene preferably comprises from about 0.2 to about 2.5 percent halogen by weight, more preferably from about 0.5 to about 2.2 percent halogen by weight, and most preferably from about 1.0 to about 1.8 percent halogen by weight. The halogenated polyisobutylene is preferably a chlorinated or brominated polyisobutylene. It is also preferred that the halogenated polyisobutylene have a Mooney viscosity at 125° C. of from about 20 to about 70 units, more preferably from about 25 to about 65, more preferably from about 25 to about 55 and most preferably from about 33 to about 45. In a preferred aspect of the invention, the halogenated polyisobutylene is EXXON HT1066®, which comprises about 1.2% chlorine by weight and which is readily available commercially.

The master batch, comprising a blend of peptized natural rubber and a halogenated polyisobutylene, is then also preferably dropped onto a roll mill, where it is cooled and sheeted. The master batch is then reintroduced into the Banbury mixer, where a medium molecular weight polyisobutylene, a nonextractable plasticizer and one or more mineral fillers are blended therewith to provide a finished batch. The medium molecular weight polyisobutylene preferably has a molecular weight of from about 200,000 to about 450,000 daltons, more preferably from about 250,000 to about 350,000, and most preferably from about 280,000 to about 320,000. An example of an excellent polyisobutylene for use in accordance with the invention is VISTANEX®, which is readily available from Exxon Chemical Company (Houston, Tex.). A wide variety of copolymers of isobutylene are also expected to be acceptable substitutes for polyisobutylene.

The nonextractable plasticizer may be selected, for example, from among a wide variety of polybutenes available commercially from, for example, Amoco Chemical Company (Chicago, Ill.). Polybutene imparts excellent electrical properties to the product, which properties prove advantageous where the product is used to cover electrical connections. While it is not intended that the present invention be limited by any theory whereby it achieves its advantageous result, it is believed that the nonextractable plasticizer provides excellent characteristics to inventive products by softening and tackifying the product. The nonextractable plasticizer is also believed to improve the processability of blends in accordance with the invention, allowing an excellent degree of mixing to be achieved in a Banbury mixer. Another example of a nonextractable plasticizer which may advantageously be used in accordance with the invention is PARAPLEX®, which is commercially available from Rhom & Haas Company (Philadelphia, Pa.). Alternate plasticizers may be used, as would be evident to a person skilled in the art.

With respect to mineral fillers, there are a wide variety available on the market, including, for example, ground mica, carbonates, clays, silicas and talcs. While it is believed that a wide variety of mineral fillers may be advantageously used in accordance with the invention, a preferred mineral filler is MISTRON VAPOR, which is a readily available talc. The mineral fillers are believed to provide structural reinforcement to an inventive product, and also improve processability of blends in accordance with the invention. It is readily understood that the proportions of medium molecular weight polyisobutylene, plasticizer and mineral filler may be altered to alter the processability of a given inventive composition.

In certain preferred aspects of the invention, additional additives may be blended into the master batch, along with those described above, to provide the finished batch. For example, in one preferred aspect of the invention, carbon black is added to the master batch along with the polyisobutylene, plasticizer and mineral filler. A wide variety of grades of carbon black may be utilized, including furnace grades and thermal grades. In one preferred aspect of the invention, the carbon black is a medium thermal ("MT") grade, such as, for example, THERMOBLACK, which is an M990 carbon black (ASTM D 24). Such materials are readily available commercially from such companies as Phillips Petroleum Company, Inc. (Bartlesville, Okla.) and R. T. Vanderbilt Company, Inc. (Norwalk, Conn.). As an alternative, inventive products may also include a wide variety of pigments, these being known in the art and available commercially.

Another additive in certain preferred aspects of the invention is an antioxidant. While inventive compositions are particularly resistant to deterioration by oxidation, the presence of an antioxidant will farther improve resistance. While a wide variety of antioxidants commercially available may be used in accordance with the invention, it is preferred that the antioxidant selected is stable at temperatures present under processing conditions of the invention. In certain aspects of the invention, for example, it is preferred that the antioxidant be stable at temperature of from about 200° F. to about 350° F., more preferably at temperature of from about 200° F. to about 250° F. Preferred antioxidants are alkyl-substituted quinoline antioxidants such as, for example, 1,2-dihydro-2,2,4-trimethylquinoline, which is available commercially from American Cyanamid Co. It is readily understood that additional or alternate additives may be desired in inventive products to alter various characteristics thereof.

It is within the purview of a skilled artisan to determine, without undue experimentation, amounts and ratios of starting materials which should be blended in order to produce inventive compositions having various characteristics. The master batch, for example, preferably comprises a ratio of polyisoprene to halogenated polyisobutylene of from about 2:3 to about 4:1, more preferably from about 1:1 to about 2:1 and most preferably of about 3:2. Thus, per 100 parts, the master patch preferably comprises from about 40 parts to about 80 parts polyisoprene by weight and from about 20 parts to about 60 parts halogenated polyisobutylene, more preferably from about 50 parts to about 67 parts polyisoprene and from about 33 parts to about 50 parts halogenated polyisobutylene and, most preferably, about 60 parts polyisoprene and about 40 parts halogenated polyisobutylene. In processes utilizing natural rubber, it is preferred that the peptizing be achieved by blending into the natural rubber from about 0.2 to about 1.4 parts peptizer per 100 parts natural rubber.

To provide a finished batch, it is preferred that from about 20 to about 40 parts medium molecular weight polyisobutylene be added per 100 parts master batch composition, more preferably from about 25 to about 35 parts polyisobutylene and, most preferably, about 30 parts. It is preferred that from about 2 to about 18 parts nonextractable plasticizer be added per 100 parts master batch composition, more preferably from about 5 to about 15 parts and, most preferably, about 10 parts. It is preferred that from about 40 to about 80 parts mineral filler be added per 100 parts master batch composition, more preferably from about 50 to about 70 parts and, most preferably, about 60 parts.

In embodiments which comprise carbon black, it is preferred that from about 10 to about 50 parts carbon black be added per 100 parts master batch composition, more preferably from about 20 to about 40 parts and, most preferably, about 30 parts. In embodiments which comprise an antioxidant, it is preferred that from about 0.5 to about 5 parts antioxidant be added per 100 parts master batch composition, more preferably from about 1 to about 3 parts and, most preferably, about 2 parts.

The finished batch, after being formed into sheets and preferably being aged for at least about 24 hours, is then formed into tape, preferably using a calendering process, such a process being well known in the relevant field. The calendering process preferably forms the finished batch into a layer having a width of from about 2 to about 10 feet. This layer may preferably be trimmed and is then, in combination with a film backing, continuously rolled onto, for example, a cardboard cylinder or other core using conventional tape winding equipment to provide a "master roll." The inventive composition, in combination with a backing, is preferably rolled onto a master roll until the master roll has a diameter of, for example, from about 1 foot to about 4 feet. It is preferred that master rolls are relatively loosely wound around the cylinder or core under minimal tension so that premature elongation of the self-fusing sheet is avoided. The master roll is then advantageously used as a material feed in a re-rolling/slitting operation to produce finished product. For example, in one preferred aspect of the invention, the master roll tape is first re-rolled onto a core having a diameter of, for example, from about 1 to about 2 inches, then the layer and film backing are cut in a direction parallel to the longitudinal axis of the cylinder when a desired length of tape is present on the final roll, such as, for example, about 15 feet. The final roll is then slit into individual rolls of tape having a width of, for example, from about 1 inch to about 8 inches. For applications in which an inventive product is to be elongated by hand, it is preferred that the tape have a width of from about 1 to about 2 inches, more preferably of about 1.5 inches. It is readily understood that the material being fed from the master roll may be cut to the desired width first and then re-rolled into individual tape rolls; however, it is believed that this manner of producing finished product is not as economical as re-rolling prior to slitting at the desired tape width.

The thickness of a n inventive tape is relevant to strength characteristics. That is, tapes of different strength can be prepared from the same ingredients by varying tape thickness. In general, the strength of the tape can be increased by increasing tape thickness; however, as the tape thickness is increased, so is the difficulty of elongating the tape. Although thick tapes can be readily elongated by machine, the present invention is directed in preferred aspects towards tapes in convenient roll form which may be conveniently elongated and applied by hand. Accordingly, in preferred aspects of the invention, the maximum tape thickness is constrained by the need to provide a tape which is conveniently elongated by hand. In view of the above, tape rolls made in accordance with the present invention preferably have a thickness of from about 0.001 to about 0.120 inches, more preferably from about 0.025 to about 0.095 inches and most preferably from about 0.025 to about 0.035 inches.

In view of the foregoing, a skilled artisan would be able to contemplate variations and modifications of the descriptions provided, such alterations, modifications and adjustments being intended to fall within the scope and spirit of the invention as defined in the following claims.

What is claimed is:

1. A self-fusing composition comprising:
a base composition comprising from about 40 to about 80 parts by weight of a partially pre-crosslinked polyisoprene per 100 parts base composition and from about 20 to about 60 parts by weight of a halogenated polyisobutylene per 100 parts base composition;
from about 20 to about 40 parts by weight, per 100 parts base composition, of a second polyisobutylene;
from about 2 to about 18 parts by weight, per 100 parts base composition, of a non-extractable plasticizer; and
from about 40 to about 80 parts by weight, per 100 parts base composition, of a mineral filler.

2. The composition according to claim 1, wherein said composition is formed into a tape having a thickness of from about 0.001 to about 0.120 inches and a width of from about 1 to about 8 inches.

3. The composition according to claim 1, wherein the halogenated polyisobutylene comprises from about 0.2 to about 2.2% by weight of a halogen selected from the group consisting of chlorine and bromine.

4. The composition according to claim 3, wherein the halogen comprises bromine.

5. The composition according to claim 3, wherein the halogen comprises chlorine.

6. The composition according to claim 5, wherein the halogenated polyisobutylene comprises from about 0.2 to about 2.5% chlorine by weight.

7. The composition according to claim 5, wherein the halogenated polyisobutylene comprises from about 0.5 to about 2.2% chlorine by weight.

8. The composition according to claim 5, wherein the halogenated polyisobutylene comprises from about 1.0 to about 1.8% chlorine by weight.

9. The composition according to claim 5, wherein the halogenated polyisobutylene comprises about 1.2% chlorine by weight.

10. The composition according to claim 1, further comprising from about 0.5 to about 5 parts by weight of an antioxidant per 100 parts base composition.

11. The composition according to claim 10, wherein the antioxidant comprises an alkyl-substituted quinoline.

12. The composition according to claim 10, wherein the antioxidant comprises 1,2-dihydro-2,2,4-trimethylquinoline.

13. The composition according to claim 1, further comprising from about 10 to about 50 parts by weight carbon black per 100 parts base composition.

14. The composition according to claim 1, further comprising from about 20 to about 40 parts by weight carbon black per 100 parts base composition.

15. The composition according to claim 1, further comprising about 30 parts by weight carbon black per 100 parts base composition.

16. The composition according to claim 1, wherein the partially pre-crosslinked polyisoprene is a peptized polyisoprene.

17. The composition according to claim 1, wherein the partially pre-crosslinked polyisoprene is selected from the group consisting of partially pre-crosslinked Indonesian rubber and partially pre-crosslinked Malaysian rubber.

18. The composition according to claim 1, wherein the halogenated polyisobutylene has a Mooney viscosity of from about 20 to about 70 at 125° C.

19. The composition according to claim 1, wherein the halogenated polyisobutylene has a Mooney viscosity of from about 25 to about 65 at 125° C.

20. The composition according to claim 1, wherein the halogenated polyisobutylene has a Mooney viscosity of from about 25 to about 55 at 125° C.

21. The composition according to claim 1, wherein the halogenated polyisobutylene has a Mooney viscosity of from about 33 to about 45 at 125° C.

22. The composition according to claim 1, wherein the non-extractable plasticizer comprises polybutene.

23. The composition according to claim 1, wherein the mineral filler comprises a member selected from the group consisting of ground mica, carbonates, clays, silicas and talcs.

24. The composition according to claim 1, wherein the mineral filler comprises platey talc.

25. The composition according to claim 1, further comprising a pigment.

* * * * *

UNITED STATES PATENT AND TRADEMARK OFFICE
CERTIFICATE OF CORRECTION

PATENT NO. : 5,914,371
DATED : June 22, 1999
INVENTOR(S) : Bernard K. Mueller

It is certified that error appears in the above-identified patent and that said Letters Patent is hereby corrected as shown below:

On the title page, Item [56] References Cited, please change "5,268,151" to --5,268,051--.

In column 1, line 36, please change "riot" to --not--.

In column 8, line 44, please change "farther" to --further--.

In column 9, line 66, please change "a n" to --an--.

Signed and Sealed this

Sixth Day of March, 2001

Attest:

NICHOLAS P. GODICI

Attesting Officer

Acting Director of the United States Patent and Trademark Office